Dec. 26, 1939.  R. A. SANDBERG  2,184,651
BUMPER GUARD STRUCTURE
Filed July 29, 1938
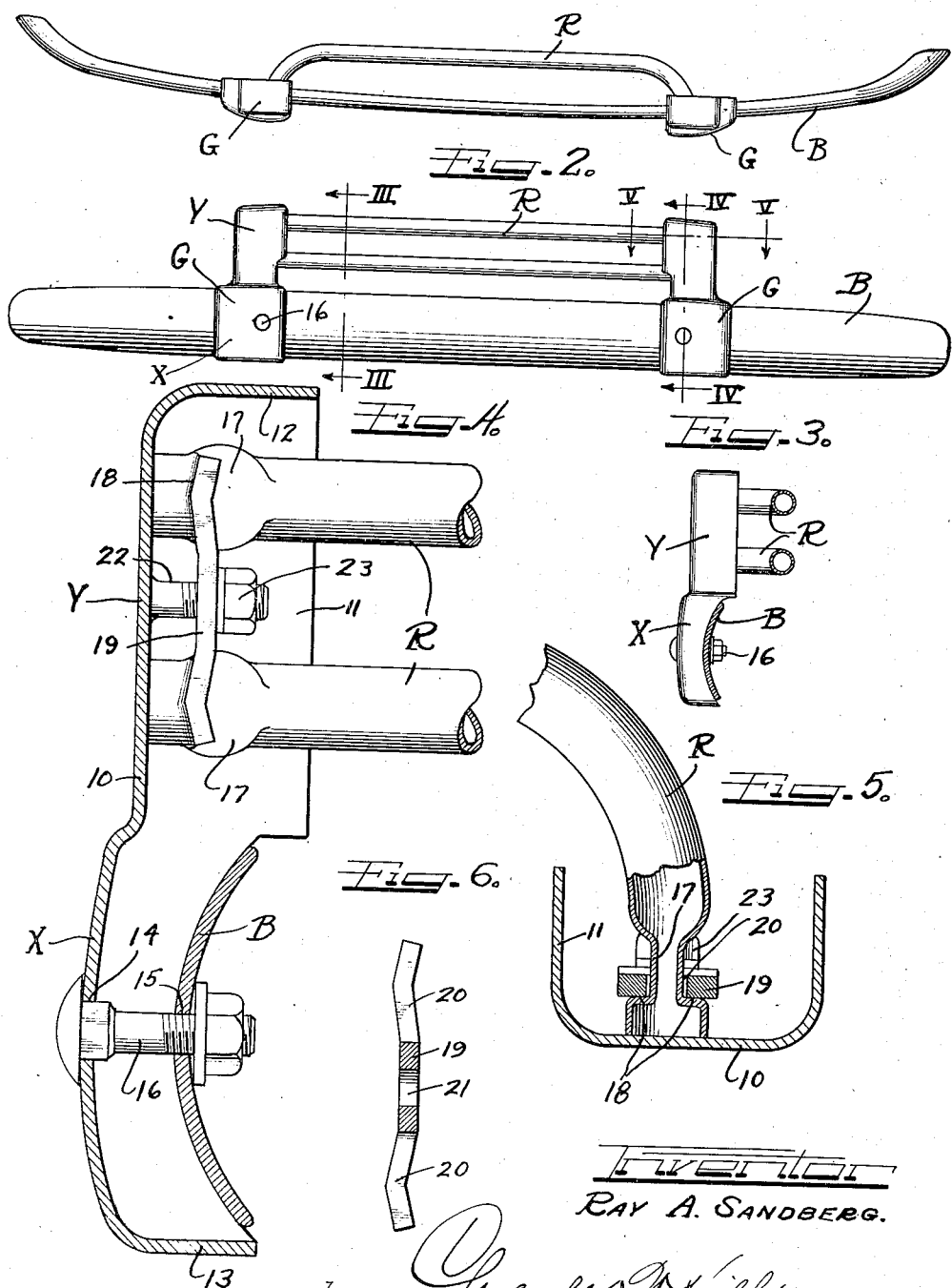
Inventor
RAY A. SANDBERG.

Patented Dec. 26, 1939

2,184,651

UNITED STATES PATENT OFFICE 2,184,651

BUMPER GUARD STRUCTURE

Ray A. Sandberg, Waukegan, Ill., assignor to Houdaille-Hershey Corporation, Detroit, Mich., a corporation of Michigan Application July 29, 1938, Serial No. 221,979

7 Claims. (Cl. 293—55)

My invention relates to bumper structure for automobiles and particularly to improved guard structure mounted on the impact bar of a bumper structure.

An important object of my invention is to provide an improved arrangement of guard structure involving the cross connection by bars or tubes of the upper portions of guards mounted on the impact bar of a bumper structure, particularly at the front of an automobile, with the cross bars disposed in front of the radiator or radiator grille to afford protection therefor against collision or impact by the bumper structures of other cars.

A further important object of the invention is to provide simplified and improved means for rigidly securing the cross bars at their ends to the guards.

My improved structure and arrangement is disclosed on the drawing, in which:

Figure 1 is a plan view of a bumper impact bar and my improved guard structure applied thereto;

Figure 2 is a front elevation of the assembly;

Figure 3 is an enlarged section on plane III—III of Figure 2;

Figure 4 is an enlarged section on plane IV—IV of Figure 2;

Figure 5 is an enlarged section on plane V—V of Figure 2; and

Figure 6 is a longitudinal section of a clamping bar.

On the drawing, B represents the horizontally extending impact bar of a bumper structure secured to a vehicle. The guard structure comprises the guard frames G and the cross bars or rails R secured at their ends to the upper portions of the guard frames.

The guard frames are of generally channel or U-shaped cross section comprising the front wall 10, the side walls 11, the top wall 12, and the bottom wall 13, each guard frame being preferably formed integral from suitable sheet metal. Each guard frame is shaped to provide a lower or body portion X and an upper or arm portion Y. The side walls 11 of the body portion X have their rear edges convexed in order to fit against the transversely convexed bumper bar B, and the body part X and the bumper bar have registering bolt holes 14 and 15 for receiving a fastening element such as a bolt 16 for rigidly securing the guard frame to the bumper bar.

The cross bars may be of any type. As shown, they are lengths of tubing, preferably of steel, and one or more bars may be provided. At its ends each bar is given a gradual 90° bend so that the ends of the bars may abut against the inner sides of the upper or arm portions Y of the guard frames G, as clearly shown on Figures 4 and 5. A distance inwardly from each end of the bar diametrically opposite portions are deflected or pressed inwardly a distance to form a neck 17 of oblong cross section and to provide shoulders 18, the neck and shoulders serving to receive clamping means for clamping the bar end against the inner side of the guard frame. I have shown two guard bars or rails R vertically spaced apart and to secure the bars at their ends to the guard frames I provide clamping plates 19 having longitudinally extending slots 20 at their ends for receiving the necks 17 of the respective bars and for seating against the shoulders 18 thereof. Intermediate its slotted ends, each clamping bar has a hole 21 for receiving a stud 22 connected or secured to the front wall of the guard frame and threaded at its end to receive a nut 23 for drawing the bar toward the guard frame to clamp the respective rail bars to the guard frame. The studs 22 may be ordinary bolts passed through openings in the bumper bar B or, as shown, the studs 22 may be secured by butt welding or brazing thereof to the guard frame.

To further secure the cross bars R against displacement, the shoulders 18 may have irregular seating surfaces for cooperation with corresponding irregular engaging surfaces of the clamping plate 19. As shown the shoulders 18 are of concave or V form and the engaging ends of the clamping plate are of corresponding convex or V shape so that the cross bars are rigidly secured to the guard frame against displacement in any direction.

When my improved guard structure is applied to the impact bar of the front bumper structure of an automobile, the cross bars R will extend in front of the radiator structure to afford protection therefor against bumps by other cars. My improved means for securing the ends of the cross bars to the guard frame is very simple and efficient and the structure can be readily assembled or taken apart for replacement.

I have shown a practical and efficient embodiment of the various features of my invention but I do not desire to be limited to the exact construction and arrangement shown and described as changes and modifications may be made without departing from the scope of the invention.

I claim as follows:

1. A bumper guard structure comprising guard frames attachable in horizontally spaced relation to the impact bar of a bumper structure to extend transversely thereof, a number of guard rails extending between said guard frames and deflected forwardly at their ends to abut the rear sides of said frames, means providing clamping shoulders at the ends of said rails, clamping plates spanning said clamping shoulders, and means on said frames for forcing said clamping plates into intimate clamping engagement with said shoulders to prevent displacement of said rails relative to said frames.

2. Bumper guard structure comprising guard frames attachable in spaced horizontal relation to the impact bar of a bumper structure, a guard rail in the form of a tube extending between said frames and deflected forwardly at its ends into abutting engagement with said frames, said tube at its ends having opposite portions deflected to provide clamping necks and clamping shoulders, clamping plates receiving said necks and abutting said shoulders and means on said frames for forcing said clamping plates into intimate clamping engagement with said shoulders whereby to prevent displacement of said guard rail relative to said frames.

3. A bumper guard structure comprising hollow guard frames attachable in horizontal spaced relation to the impact bar of a bumper structure to extend upwardly therefrom, a pair of guard rails extending between the upper portions of said guard frames and deflected forwardly at their ends for abutting engagement with the inner side of the front walls of said guard frames, said rails at their ends being provided with clamping shoulders, a clamping plate within each guard frame engaging at its ends with the clamping shoulders of the respective rails, a threaded stud anchored to each guard frame to receive the respective clamping plates, and a nut for each stud for forcing the clamping plates into clamping engagement with the respective clamping shoulders whereby displacement of said rails relative to said frames is prevented.

4. A bumper guard structure comprising guard frames attachable in spaced relation to the impact bar of a bumper structure to extend upwardly therefrom, guard bars rearwardly of the impact bar and above the level thereof and extending between the upper portions of said guard frames and being deflected forwardly at their outer portions for engagement of their end faces with the rear sides of said guard frames, means providing clamping shoulders on said bars adjacent to their end faces, clamping plates engaging with said clamping shoulders, and means extending from the guard frames for forcing said clamping plates into clamping engagement with said shoulders to maintain said abutting engagement.

5. A bumper guard structure comprising hollow guard frames attachable in spaced relation to the impact bar of a bumper structure to extend transversely thereof, a guard rail rearwardly of and above said impact bar and extending between said guard frames and deflected forwardly at its ends into said hollow guard frames for abutting engagement of its end faces with the front walls of said guard frames, abutments on said deflected ends, and clamping means concealed within said guard frames for engagement with said abutments for maintaining such abutting engagement.

6. A bumper guard structure comprising hollow guard frames attachable in horizontally spaced relation to the impact bar of a bumper structure to extend transversely thereof, a guard rail extending rearwardly of and between said guard frames and deflected forwardly at its ends for abutting engagement of its end faces with said guard frames, clamping plates in said frames and clamping means extending from said frames for interlocking said clamping plates with the guard bar ends for maintaining said abutting engagement to prevent displacement of said guard bar relative to said frames.

7. A bumper guard structure comprising two guard frames attachable to the impact bar of a bumper structure to extend transversely thereof, U-shaped guard rails arranged one above the other in horizontal planes and extending between and with their ends abutting said frames and having clamping shoulders adjacent to their ends, clamping plates engaging said clamping shoulders, and means on said frame for forcing said clamping plates into intimate clamping engagement with said shoulders whereby to secure said rails to said frames.

RAY A. SANDBERG.